Figures 1, 2:
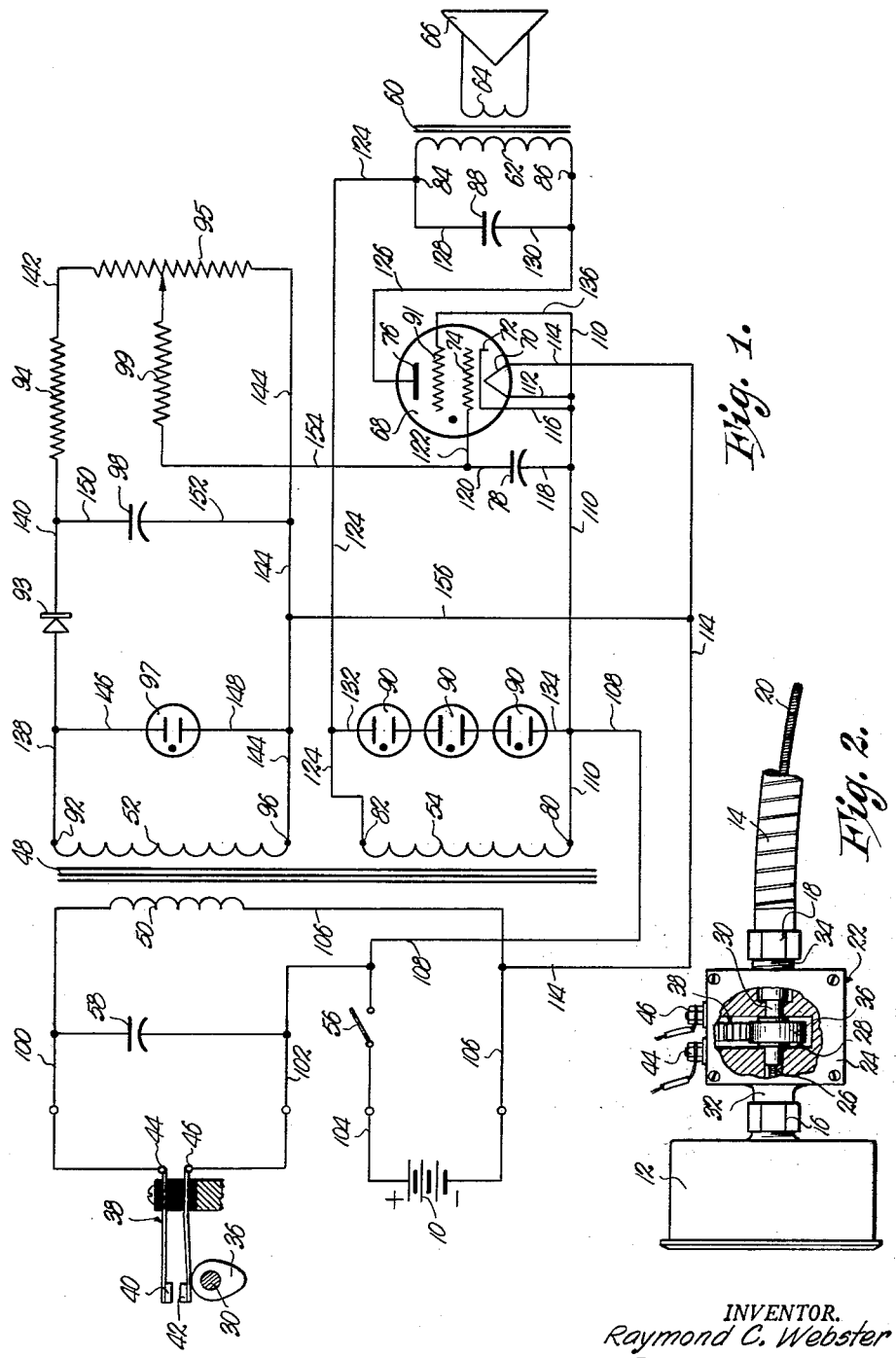

Aug. 16, 1955 R. C. WEBSTER 2,715,723
VEHICLE SPEEDOMETER HAVING ELECTRICAL ALARM SYSTEM
Filed Feb. 23, 1954

INVENTOR.
Raymond C. Webster
BY
ATTORNEY.

United States Patent Office 2,715,723
Patented Aug. 16, 1955

2,715,723

VEHICLE SPEEDOMETER HAVING ELECTRICAL ALARM SYSTEM

Raymond C. Webster, Kansas City, Mo., assignor to W. E. Anderson, Inc., Kansas City, Mo.

Application February 23, 1954, Serial No. 412,003

3 Claims. (Cl. 340—263)

This invention relates to the field of accessories for automobile vehicles and, more particularly, to an electrical speed alarm system for use in conjunction with the speedometer of an automobile.

It is the primary object of this invention to provide means for warning the operator of an automobile by signals supplementary to the indication of the speedometer conventionally provided whenever the speed of the automobile exceeds a certain predetermined level.

It is a further important object of this invention to provide such warning means wherein the system is adjustable to adapt the same for giving warning when the speed of the automobile exceeds any selectively chosen velocity.

Other important objects of this invention, including important details of construction rendering the contemplated apparatus simple in nature, fool-proof in operation and inexpensive to manufacture, will be made clear or become apparent as the following description of the invention progresses.

In the accompanying drawing:

Figure 1 is a schematic circuit diagram illustrating the electrical circuitry of the alarm system contemplated by this invention; and Fig. 2 is a side elevational view of the switch adaptor forming a part of this invention coupled in operative position between the speedometer and the speedometer cable of an automobile, parts being broken away for clarity of illustration.

In the drawing, the numeral 10 indicates a battery, the numeral 12 indicates a speedometer, and the numeral 14 indicates a speedometer cable, all conventionally constituting a portion of an automobile with which the system of this invention may be used. Speedometer 12 and speedometer cable 14 are provided with complementary coupling means 16 and 18 respectively which are conventionally fitted together in an automobile to provide mechanical coupling between a flexible rotating shaft 20 forming a part of speedometer cable 14 and the working parts of speedometer 12.

Provided as a part of this invention is a switching adaptor generally designated 22 having a housing 24 provided with a shaft receiving bore 26 and a switch and cam chamber 28. A rotatable shaft 30 is disposed within bore 26 and provided with fittings 32 and 34 respectively adapted for operable coupling with fitting 16 of speedometer 12 and fitting 18 of speedometer cable 14. When fitting 18 and fitting 34 are joined the rotary motion of shaft 20 is transmitted to shaft 30, and when fitting 16 and fitting 32 are joined the rotary motion of shaft 30 is transmitted to the working parts of speedometer 12. Thus, adaptor 22 may be conveniently installed between cable 14 and speedometer 12 without modification of either of the latter.

Within chamber 28 is provided an eccentric cam 36 rigidly mounted upon shaft 30 for rotation therewith, cam 36 being preferably formed of electrical insulating material or provided with a peripheral surface covering of such material. Operatively disposed with respect to cam 36 within chamber 28 is a normally open, single pole, single throw switch 38 having a stationary contact arm 40 and a swingable contact arm 42 disposed in engagement with the peripheral surface of cam 36 and adapted for swinging movement to a position engaging contact arm 40 once during each revolution of cam 36. Adaptor 22 is provided with a pair of electrical terminals 44 and 46 respectively connected with arms 40 and 42 of switch 38.

A power transformer 48 having a primary winding 50 and a pair of secondary windings 52 and 54 has its primary winding 50 coupled in series with switch 38 by a conductor 100. Switch 38 and primary winding 50 are in turn coupled across battery 10 by conductors 102, an on-off switch 56, a conductor 104 and a conductor 106 to present a pulse generating circuit which imposes a pulse of electrical current through primary winding 50 each time that shaft 30 completes one revolution and thereby momentarily closes switch 38.

A capacitor 58 is coupled in parallel with switch 38 to minimize sparking thereof.

An output transformer 60 is provided and has a primary winding 62 and a secondary winding 64. Secondary winding 64 of output transformer 60 is coupled with any suitable indicating device, but preferably a loud speaker 66 as illustrated.

Electronic gating means in the form of an electron tube 68 having a filament 70, a cathode 72, a control grid 74 and an anode 76 is provided for selectively making and breaking a power circuit hereinafter to be described coupling secondary winding 54 of power transformer 48 with the primary winding 62 of output transformer 60. Filament 70 is supplied with heater current through conductors 108, 110, 112 and 114. Cathode 72 is connected with the positive terminal of battery 10 by conductors 116, 110, 108, switch 56 and conductor 104. A capacitor 78 is coupled between cathode 72 and control grid 74 by conductors 116, 110, 118, 120 and 122, capacitor 78 being provided for the purpose of by-passing high frequency signal components which might otherwise appear on grid 74 to the cathode 72.

One side 80 of secondary winding 54 of power transformer 48 is connected with cathode 72 by conductor 110. The other side 82 of secondary winding 54 is connected with one side 84 of primary winding 62 of output transformer 60 of conductor 124. The other side 86 of primary winding 62 is coupled with anode 76 of tube 78 by a conductor 126. A capacitor 88 is conventionally connected in parallel across primary winding 62 of output transformer 60 by conductors 128 and 130. A number of glow discharge tubes 90 are connected in series with each other if there be more than one of same, and are coupled in parallel with secondary winding 54 of power transformer 48 by conductors 132, 124, 134 and 110. Glow discharge tubes 90 are provided for the purpose of limiting the amplitude of voltage which may be carried along conductors 110 and 124 for imposition across tube 68 and its anode load circuit 62. Tubes 90 may conveniently be neon lamps having suitable firing voltage characteristics, and tube 68 may conveniently be a type 2D21 electron tube. It is noted that the second or suppressor grid 91 found in tube 68, if a type 2D21 tube is used, should be coupled with the cathode by a conductor 136 and conductor 110.

The other secondary winding 52 of power transformer 48 is coupled with a rectifier circuit including a conductor 138 connected with one side 92 of secondary winding 52 and with any rectifier 93, preferably of the dry disc type, in turn coupled with a conductor 140 with a limiting and filtering resistor 94 in turn coupled by a conductor 142 with a variably tapped load resistor 95 having its opposite end coupled by a conductor 144 with the other side 96 of secondary winding 52. A glow discharge tube 97, which is preferably a neon lamp or a plurality of same connected in series, is coupled in parallel with secondary winding 52 by conductors 146, 138, 148 and 144. A filtering capacitor 98 is coupled between conductors 140 and 144 by conductors 150 and 152.

The variable tap of load resistor 95 is coupled through a limiting resistor 99 and conductors 154 and 122 with grid 74 of tube 68. Bias is provided for tube 68 through the coupling of the negative terminal of battery 10 with conductor 144 through conductors 106, 114 and 156.

The operation of the alarm system of this invention is as follows. When on-off switch 56 is closed filament 70 is supplied with heater current from battery 10 through the circuit including conductor 104, switch 56, conductor 108, conductor 110, conductor 112, filament 70, conductor 114 and conductor 106. Simultaneously, assuming switch 38 to be open at the moment, grid 74 of tube 68 is biased negatively with respect to cathode 72 by virtue of the connection of cathode 72 with the positive terminal of battery 10 through conductor 104, switch 56, conductor 108, conductor 110 and conductor 116 and the coupling of the negative terminal of battery 10 with grid 74 through conductor 106, conductor 114, conductor 156, conductor 144, a portion of load resistor 95, resistor 99 connected with the variable tap of resistor 95, conductors 154 and 122, it being noted that since no current is flowing through the last traced circuit there is no voltage drop through resistors 95 and 99 and the full negative potential from battery 10 is imposed upon grid 74 to bias tube 68 to a cut-off state of non-conduction.

When shaft 30 passes through that part of its revolution where cam 36 momentarily closes and then opens contacts 40 and 32 of switch 38 a pulse of current from battery 10 is passed through primary winding 50 of power transformer 48, the circuit being traceable through conductor 104, closed switch 56, conductor 102, switch 38, conductor 100, secondary winding 59 and conductor 106. The passage of the pulse through primary winding 50 creates a similar pulse of current flow in each of secondary windings 52 and 54. The voltage thus created in the power circuit connected with secondary winding 54 is imposed between cathode 72 of tube 68 and anode 76 thereof through the anode load circuit 62. However, since tube 68 is in a state of being biased to cut-off, no current can flow through load circuit 62 in the absence of some other change in the operating conditions to which tube 68 is subjected.

Such change is provided by rectification in the rectifier circuit connected with secondary winding 52 of power transformer 48 of the pulse produced in the latter, such rectified voltage thus created being passed through load resistor 95 to create a voltage drop in the latter and place the variable tap of load resistor 95 at a potential which is positive with respective to conductor 144 and of potential level dependent upon the positioning of the tap of resistor 95. Since the currents induced in secondary winding 52 and rectified by rectifier 93 are of a pulse character it is clear that the amount of voltage drop across resistor 95 or a given portion thereof will vary directly with the number of pulses induced in secondary winding 52 per unit of time. In other words, when the automobile is travelling at a fast rate of speed and thereby rotating the shaft 30 rapidly to closely space with time the pulses initiated by closings of switch 38, the voltage drop across resistor 95 will be maintained at a higher level than when the automobile is travelling, and the pulses are being generated, more slowly.

When resistor 99 is tapped upon resistor 95 at a position where the positive potential thus imposed upon grid 74 of tube 68 through conductors 154 and 122 approximately equals or exceeds the constant bias on tube 68, the latter will be placed in a condition for conduction and current will flow through the anode load circuit 62 of tube 68 to produce an observable signal from indicator 66 corresponding to each closing of switch 38 and each resultant pulse induced in secondary winding 54.

When indicating device 66 comprises a loud speaker, the indication given will be a clicking sound produced for each closing of switch 38, the frequency of such sounds serving as an auxiliary indication and warning of the speed of the vehicle.

In order that the operator of the vehicle will not be subjected to such warning sounds except when he exceeds a preselected speed, the tapping of resistor 99 upon resistor 95 is made adjustable. By properly positioning such connection between resistor 99 and 95 upon the latter, the system may be set so that the positive potential imposed upon grid 74 equals or exceeds the negative bias constantly applied thereto at any given speed, the speed so chosen being that one which will produce pulses at a rate just sufficient to maintain the voltage drop across that portion of resistor 95 between resistor 99 and conductor 144 at the potential level required to overcome the negative bias on tube 68.

Then, whenever the speed of the automobile and the pulses from the closing of switch 38 exceed a given rate, tube 68 will conduct and produce in indicator 66 sounds corresponding to each pulse resulting from a closing of switch 38. If the speed of the automobile is further increased above such velocity, the frequency of the warning indications from device 66 will also increase.

It will, therefore, be apparent that the apparatus of this invention provides a simple, flexible, fool-proof and inexpensive means of furnishing warnings of the attainment by an automobile of velocities in excess of a predetermined speed. Manifestly, many minor changes and modifications might be made in the structure illustrated without materially departing from the true spirit and intention of this invention. Accordingly, it is desired to be limited only by the scope of the appended claims.

Having thus described the invention, what is claimed as new and desired to be secured by Letters Patent is:

1. A speed alarm for an automobile having a battery and a rotating speedometer shaft, said alarm comprising an indicating device requiring electrical power for operation; an output transformer having a primary winding and a secondary winding, the latter being coupled with said device; a power transformer having a primary winding and a secondary winding; a power circuit coupling the secondary of the power transformer with the primary of the output transformer; a pulse generating circuit adapted to couple the primary of the power transformer with said battery; an electrical switching assembly adapted for coupling with said shaft, connected in series with said pulse generating circuit and adapted for alternately making and breaking said last-mentioned circuit during each revolution of said shaft; electronic gating means coupled in said power circuit and adapted for selectively opening and closing said power circuit; and a control circuit coupled with said pulse generating circuit and with said gating means for controlling the latter to close said power circuit only when the frequency of generation of pulses by the pulse generator circuit exceeds a predetermined rate.

2. A speed alarm for an automobile having a battery and a rotating speedometer shaft, said alarm comprising an indicating device requiring electrical power for operation; a power circuit for said device having the latter coupled therein; an electrical pulse generating circuit adapted for coupling with said battery and including an electrical switching assembly adapted for operable coupling with said shaft, connected in said pulse generating circuit and adapted for alternately making and breaking said last-mentioned circuit during each revolution of said shaft; a transformer having a primary winding and a pair of secondary windings, the primary winding being coupled with said pulse generating circuit and one of the secondary windings being coupled with said power circuit; an electronic tube having a cathode, a grid and an anode, the cathode and anode of said tube being coupled in series with said power circuit; conductive means adapted for coupling said battery to the cathode and grid of said tube for biasing the latter to a level of potential negative with respect to the cathode; a voltage rectifying circuit coupled with the other of said secondary windings; and means for coupling a positive potential output of said rectifier circuit with the grid of said tube, whereby the grid of said tube is driven positive and the tube conducts only during periods when said pulse generating circuit is producing pulses at a rate maintaining the level of said positive potential output of the rectifier circuit in excess of a predetermined magnitude.

3. A speed alarm for an automobile having a battery and a rotating speedometer shaft, said alarm comprising a normally open electrical switching assembly adapted for coupling with said shaft for closing once during each revolution of said shaft; a power transformer having a primary winding and a pair of secondary windings; conductive means coupling said switching assembly and said primary winding in series with each other and adapted for coupling same across said battery; an output transformer having a primary winding and a secondary winding; a loud speaker coupled with the secondary winding of said output transformer; an electron tube having a cathode, a control grid and an anode; conductive means coupling one side of one of said secondary windings of the power transformer with one side of the primary winding of the output transformer; conductive means coupling the other side of said one secondary winding of the power transformer with the cathode of said tube; conductive means coupling the anode of said tube with the other side of said primary winding of the output transformer; a number of glow discharge tubes coupled in series with each other and in parallel with said one secondary winding of the power transformer; a voltage rectifying circuit having a diode rectifying device and a resistor coupled in series with each other and across the other of said secondary windings of the power transformer, said resistor having a variable tap; conductive means adapted for coupling one side of said other secondary winding of the power transformer with the negative pole of said battery; and conductive means coupling said variable tap with said control grid of the electron tube.

References Cited in the file of this patent

UNITED STATES PATENTS

| | | |
|---|---|---|
| 2,068,147 | Miller | Jan. 19, 1937 |
| 2,228,032 | McGregor et al. | Jan. 7, 1941 |
| 2,347,784 | La Rocca | Feb. 22, 1949 |
| 2,441,185 | Brown et al. | May 11, 1948 |
| 2,462,655 | McHenry | Feb. 22, 1949 |
| 2,628,345 | Tod | Feb. 10, 1953 |